July 24, 1934.  R. L. HIBBARD  1,967,507
SELF CENTERING CHUCK
Filed March 5, 1934  2 Sheets-Sheet 1

INVENTOR
ROBERT L. HIBBARD
BY James C. Bradley
ATTORNEY

July 24, 1934.  R. L. HIBBARD  1,967,507
SELF CENTERING CHUCK
Filed March 5, 1934  2 Sheets-Sheet 2

INVENTOR
ROBERT L. HIBBARD
BY James C. Bradley
ATTORNEY

Patented July 24, 1934

1,967,507

UNITED STATES PATENT OFFICE 1,967,507

SELF-CENTERING CHUCK

Robert L. Hibbard, Pittsburgh, Pa., assignor of one-half to William K. Stamets, Pittsburgh, Pa.

Application March 5, 1934, Serial No. 714,085

5 Claims. (Cl. 10—107)

Figure 1:
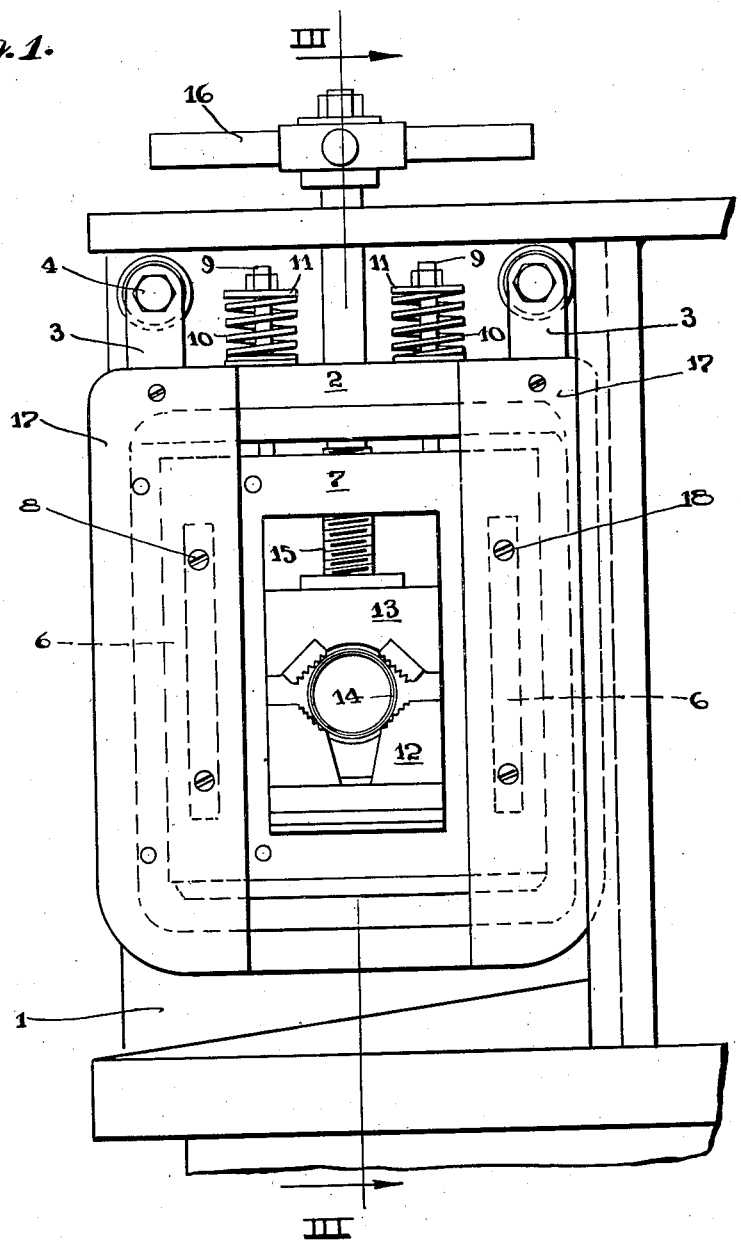
Figure 2:
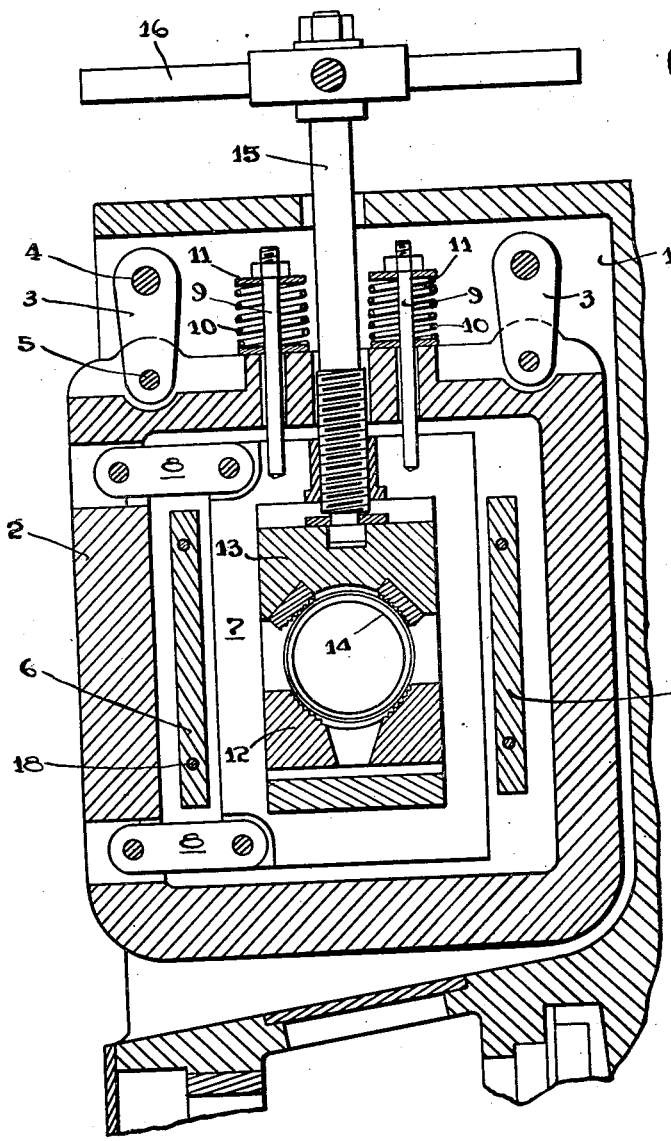
Figure 3:
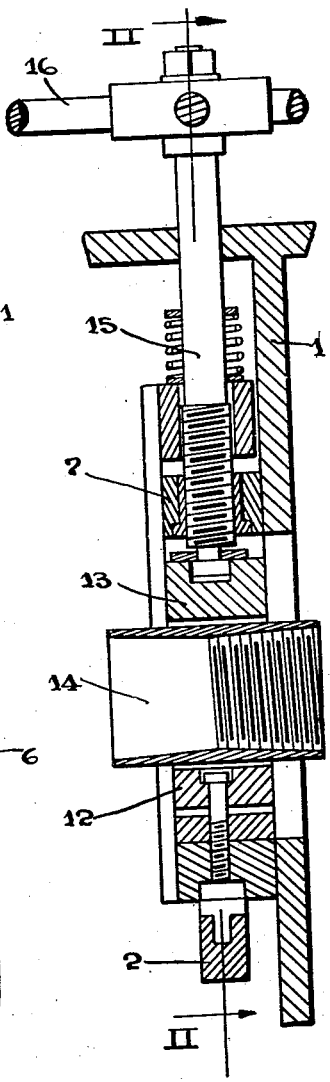

The invention relates to a floating or self-centering chuck for use in connection with threading or other machine tool operations. It is designed to carry either the clamp for holding the blank to be machined or the tool or dies which operate upon the work. If a coupling is to be reamed or tapped, the chuck carries the coupling, and if a pipe or rod is to be threaded or machined, the chuck carries the cutting dies. The embodiment of the invention shown and described is of a chuck for holding a coupling for threading, but it will be understood that the improvement is of broader application, as above indicated, and is not limited to use in threading operations or operations in which the chuck carries the blank or work. The invention has for its object the provision of a very simple, cheap self-centering chuck device supported so that the frictional resistance to the movement of the work or tool carrier in all directions is reduced to a minimum, so that the strain upon the cutting tool incident to the centering function is reduced as compared with floating chuck devices as heretofore constructed with the result, (1) that the life of the threading dies or other cutting devices is materially increased; and (2) that the character of the work done is improved. The chuck is illustrated as operating in a vertical plane, but it will be understood that the device is just as applicable to machine tools in which the chuck operates in a horizontal plane, the tool spindle in such case being vertical. One embodiment of the invention is illustrated in the accompanying drawings, wherein:

Figure 1 is a front elevation. Fig. 2 is a vertical section on the line II—II of Fig. 3. And Fig. 3 is a vertical section on the line III—III of Fig. 1.

Referring to the drawings, which illustrate the chuck, as applied to a turret of a coupling threading or tapping machine, 1 is a plate which forms a part of the turret structure, and constitutes a fixed support for the chuck during the threading operation. Mounted on the plate is a rectangular open frame 2, such frame being supported by the parallel links 3, 3 pivoted to the plate 1 at their upper ends on the bolts 4, 4 and at their lower ends pivoted at 5, 5 to the frame. The frame is thus mounted for free movement in a horizontal direction, but limited in such movement by the stop members 6, 6 (Fig. 2) which are integral with the plate 1 and project therefrom into the frame.

Mounted in the frame 2 is a second rectangular open frame 7, such frame being free to move vertically in the frame 2, but guided in such movement by the parallel links 8, 8 pivoted at their inner and outer ends respectively to the inner frame 7 and the outer frame 2. The frame 7 is limited in its vertical movement by upper and lower members of the frame 2. In order to counterbalance the frame 7 with its center in approximate alignment with the center of rotation of the threading dies, the rods 9, 9 are provided extending through the upper member of the frame 2 with the springs 10, 10 beneath the plates 11, 11 carried thereby.

Mounted in the inner frame is a pair of coupling clamping jaws 12 and 13, the lower jaw 12 being fixed and the upper jaw being guided up and down in the frame. The jaw 13 is moved up and down to release and clamp the coupling 14 by means of the shaft 15 which is swivelled to the upper jaw, and threaded through a bushing in the upper bar of the frame 7, as indicated in Figs. 2 and 3, the upper end of the shaft being provided with a hand wheel 16. Lying in front of the frame 7 along the side edges of such frame are the guide plates 17, 17 (Fig. 1), such plates being secured in position by the screws 18 which are threaded into the members 6, 6.

The work engaging means, as exemplified by the clamping jaws 12 and 13, may be variously constructed to meet requirements, the term "work engaging means" as used in the claims being inclusive of dies or other cutting tools when the work comprises a pipe or rod which is to be threaded or machined. As heretofore pointed out, it is also immaterial whether the axis of rotation of the tools or the work is horizontal or vertical. In all cases, the quality of the work is improved and the wear upon the cutting dies or tools is reduced because of the low frictional resistance incident to the link mounting as compared to constructions in which the frames move in slideways.

What I claim is:

1. In combination in a self-centering chuck, a fixed support, a frame on the support having a parallel link connection thereto, a second frame carried by the first frame having a parallel link connection thereto so that it is guided in a line at substantially right angles to the line of movement of the first frame, and work engaging means carried by the second frame.

2. In combination in a self-centering chuck, a fixed support, a frame on the support having a parallel link connection thereto, stop means on the support for limiting the movement of the frame, a second frame carried by the first frame having a parallel link connection thereto so that it is guided in a line at substantially right angles to the line of movement of the first frame, stop means on the first frame for limiting the movement of the second frame, and work engaging means carried by the second frame.

3. In combination in a self-centering chuck, a fixed support, an open frame connected to the support by parallel links, a second open frame fitting loosely inside the first frame and connected thereto by parallel links so that the second frame is guided in a line at substantially right angles to the line of movement of the first frame, and work engaging means carried in the second frame.

4. In combination in a self-centering chuck, a fixed support, a frame on the support having a parallel link connection thereto, a second frame carried by the first frame having a parallel link connection thereto so that it is guided in a line at substantially right angles to the line of movement of the first frame, and a pair of clamping jaws carried by the second frame.

5. In combination in a self-centering chuck, a fixed support, an open frame connected to the support by parallel links, a second open frame fitting loosely inside the first frame and connected thereto by parallel links so that the second frame is guided in a line at substantially right angles to the line of movement of the first frame, and a pair of opposing work clamping jaws mounted in the second frame.

R. L. HIBBARD.